(12) United States Patent
Ding et al.

(10) Patent No.: US 11,014,330 B2
(45) Date of Patent: May 25, 2021

(54) VENEER PANEL WITH THIN THERMALLY CONDUCTIVE LAYER

(71) Applicant: GOODRICH CORPORATION, Charlotte, NC (US)

(72) Inventors: Zhongfen Ding, South Windsor, CT (US); Scott Alan Eastman, Glastonbury, CT (US); Michael Paul Humbert, Wethersfield, CT (US); Steven W. Gronda, Feeding Hills, MA (US); Jacquelynn K M Garofano, Prospect, CT (US); Brian St. Rock, Andover, CT (US); Christopher L. Chapman, Lanesville, IN (US); Farzana Hussain, Prospect, KY (US)

(73) Assignee: Goodrich Corporation, Charlotte, NC (US)

( * ) Notice: Subject to any disclaimer, the term of this patent is extended or adjusted under 35 U.S.C. 154(b) by 210 days.

(21) Appl. No.: 15/469,098

(22) Filed: Mar. 24, 2017

(65) Prior Publication Data

US 2018/0272648 A1    Sep. 27, 2018

(51) Int. Cl.
*B32B 3/26*    (2006.01)
*B32B 7/12*    (2006.01)
(Continued)

(52) U.S. Cl.
CPC .............. *B32B 3/266* (2013.01); *B32B 7/12* (2013.01); *B32B 9/007* (2013.01); *B32B 15/04* (2013.01); *B32B 21/14* (2013.01); *B32B 27/06* (2013.01); *B32B 2307/302* (2013.01); *B32B 2307/3065* (2013.01); *B32B 2607/00* (2013.01)

(58) Field of Classification Search
CPC ........... B32B 3/266; B32B 7/12; B32B 9/007; B32B 15/04; B32B 21/14; B32B 27/06; B32B 2307/302; B32B 2307/3065; B32B 2607/00; E04F 2201/07
See application file for complete search history.

(56) References Cited

U.S. PATENT DOCUMENTS

| 4,241,145 A | 12/1980 | Shukla |
| 6,333,094 B1 | 12/2001 | Schneider et al. |

(Continued)

FOREIGN PATENT DOCUMENTS

| EP | 1872933 | 1/2008 |
| EP | 1871579 | 6/2011 |

OTHER PUBLICATIONS

Mungers et al, "Corr. Preven. by Protect. Coatings—Chap. 9: Surface Prep.," 2014, NACE International, 3rd Edition, pp. 199-236 (Year: 2014).*

(Continued)

*Primary Examiner* — Maria V Ewald
*Assistant Examiner* — Ethan Weydemeyer
(74) *Attorney, Agent, or Firm* — Snell & Wilmer L.L.P.

(57) ABSTRACT

A veneer panel may comprise a face veneer, a thermally conductive layer, and a backing layer bonded to the thermally conductive layer. The thermally conductive layer may comprise a chemically treated thermally conductive layer. The chemically treated thermally conductive layer may comprise a plurality of first vinyl groups chemically bonded to a first surface of the chemically treated thermally conductive layer.

9 Claims, 9 Drawing Sheets

(51) Int. Cl.
*B32B 15/04* (2006.01)
*B32B 9/00* (2006.01)
*B32B 27/06* (2006.01)
*B32B 21/14* (2006.01)

(56) References Cited

U.S. PATENT DOCUMENTS

| | | | |
|---|---|---|---|
| 8,083,878 B1 | 12/2011 | Booth et al. | |
| 8,211,549 B2 * | 7/2012 | Morgeneyer | C09D 4/06 427/331 |
| 2002/0136862 A1 * | 9/2002 | Dong | B32B 21/08 428/150 |
| 2006/0264676 A1 * | 11/2006 | Mertens | B05D 7/16 568/454 |
| 2010/0154333 A1 * | 6/2010 | Peek | C09J 5/00 52/232 |
| 2010/0233435 A1 * | 9/2010 | Hunter | A63C 17/01 428/156 |
| 2012/0067508 A1 * | 3/2012 | Booth | B32B 7/12 156/154 |
| 2014/0057075 A1 * | 2/2014 | Wang | B32B 37/12 428/138 |
| 2015/0047805 A1 * | 2/2015 | Gregory | F24D 3/14 165/53 |
| 2016/0311194 A1 | 10/2016 | Brown et al. | |

OTHER PUBLICATIONS

USPTO; U.S. Appl. No. 14/829,109, filed Aug. 18, 2015 entitled "High Thermal Conductivity Layer for Fire Resistant Wood Veneer".

* cited by examiner

VENEER PANEL WITH THIN THERMALLY CONDUCTIVE LAYER

FIELD OF INVENTION

The present disclosure relates to decorative and structural panels, and, more specifically, to a veneer panel having a thin thermally conductive layer.

BACKGROUND

Current veneer panels may include paper-backed veneer panels, fleece-backed veneer panels, and two-ply veneer panels. These veneer panels may be susceptible to tearing, wrinkling, and curling. Further, each of the existing veneer panels may experience delamination in some applications. In other instances, the veneer panels may not be useable in vehicular applications due to other limitations such as conformance with flammability regulations.

SUMMARY

A veneer panel is provided according to various embodiments. A veneer panel may comprise a face veneer, a chemically treated thermally conductive layer bonded to the face veneer, the chemically treated thermally conductive layer comprising a plurality of first vinyl groups chemically bonded to a first surface of the chemically treated thermally conductive layer, and a backing layer bonded to the thermally conductive layer.

In various embodiments, a first adhesive material may be disposed between the face veneer and the chemically treated thermally conductive layer, wherein the plurality of first vinyl groups forms a plurality of first crosslink bonds with the first adhesive material to bond the chemically treated thermally conductive layer to a back surface of the face veneer. A second adhesive material may be disposed between a second surface of the chemically treated thermally conductive layer opposite the first surface of the chemically treated thermally conductive layer, wherein a plurality of second vinyl groups bonded to the second surface of the chemically treated thermally conductive layer forms a plurality of second crosslink bonds with the second adhesive material.

In various embodiments, the chemically treated thermally conductive layer may comprise at least one of aluminum, tin, copper, stainless steel, or titanium. The chemically treated thermally conductive layer may comprise at least one of graphite, carbon mat, carbon fiber mat, carbon nanotube mat, carbon felt, carbon paper, thermally conductive elastomers, thermoplastics, or filled polymer. An in-plane thermal conductivity of the chemically treated thermally conductive layer may be greater than a through-plane thermal conductivity of the chemically treated thermally conductive layer. The chemically treated thermally conductive layer may comprise a thickness from 0.001 inches to 0.015 inches. The plurality of first vinyl groups may form a plurality of crosslink bonds with a back surface of the face veneer.

In various embodiments, a veneer panel may comprise a face veneer and a thermally conductive layer bonded to a back surface of the face veneer, wherein a first opening may be formed through the thermally conductive layer.

In various embodiments, the thermally conductive layer may comprise a thickness from 0.001 inches to 0.015 inches. The thermally conductive layer may comprise at least one of aluminum, tin, copper, steel, titanium, graphite, carbon mat, carbon nanotube mat, carbon felt, carbon paper, thermally conductive elastomers, thermoplastic, or filled polymer. The thermally conductive layer may comprise a material comprising a thermal conductivity of at least 10 W/m·K. In various embodiments, at least one of a width or a diameter of the first opening may be 0.040 inches or less. A distance between the first opening and a second opening formed through the thermally conductive layer may be 0.4 inches or less. In various embodiments, a backing layer may be bonded to the thermally conductive layer, and an adhesive material may extend between the face veneer and the backing layer through the first opening.

In various embodiments, a veneer panel may comprise a face veneer, a thermally conductive layer bonded to the face veneer, the thermally conductive layer comprising a thickness of between at least one of 0.0005 inches and 0.002 inches or 0.004 inches and 0.015 inches; and a backing layer bonded to the thermally conductive layer.

In various embodiments, the thermally conductive layer may comprise at least one of aluminum, tin, copper, steel, titanium, graphite, carbon mat, carbon fiber mat, carbon nanotube mat, carbon felt, carbon paper, thermally conductive elastomers, thermoplastics, or filled polymer. An in-plane thermal conductivity of the thermally conductive layer may be greater than a through-plane thermal conductivity of the thermally conductive layer.

In various embodiments, an adhesive material may be disposed between the face veneer and the thermally conductive layer. The adhesive material may comprise a flame retardant compound.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

3-ply wood veneer panels, according to the present disclosure, may be mounted to furniture (e.g., cabinetry, tables, chairs, etc.) or other elements within an aircraft interior. 3-ply wood veneer panels, according to the present disclosure, may comprise a thermally conductive layer disposed between two wooden layers. Adhesive material may bond the three layers together with each layer having a thickness in a first dimension that may be substantially less than a thickness of the layer in the other two dimensions. The resulting 3-ply panel may display flexibility relative to the plane formed by the two larger dimensions. The 3-ply veneer panel, according to the present disclosure, may provide weight savings, reduced packaging density, increased flexibility, decreased cost, and increased heat and flame resistance.

Figure 2A:
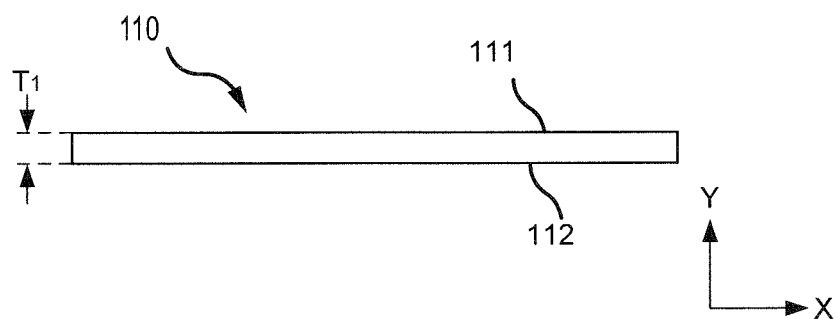
FIGS. 2A and 2B illustrate a thermally conductive layer for incorporation into 3-ply veneer panels, in accordance with various embodiments.
Figure 2B:
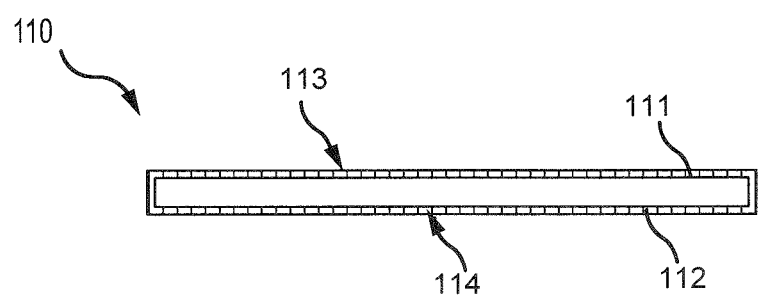
Figure 2C:
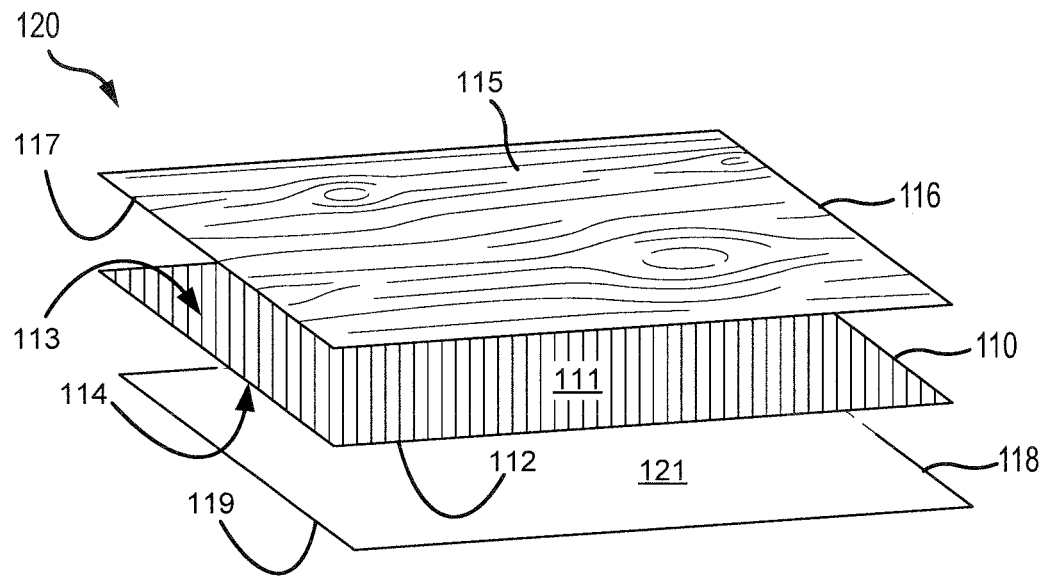
FIGS. 2C and 2D illustrate an assembly view and a cross sectional view, respectively, of a 3-ply veneer panel including a thermally conductive layer, in accordance with various embodiments.
Figure 2D:
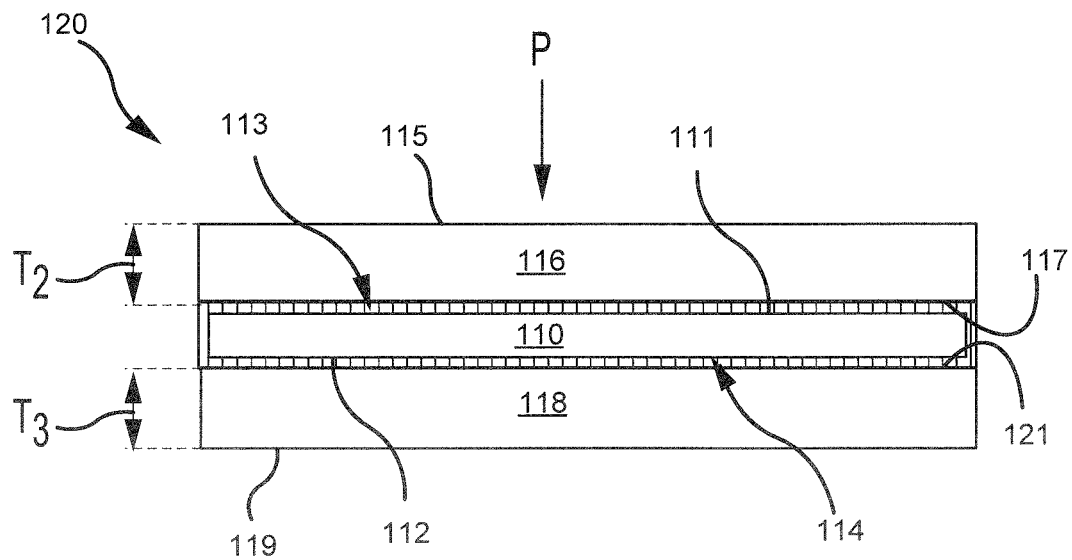
Figure 3A:
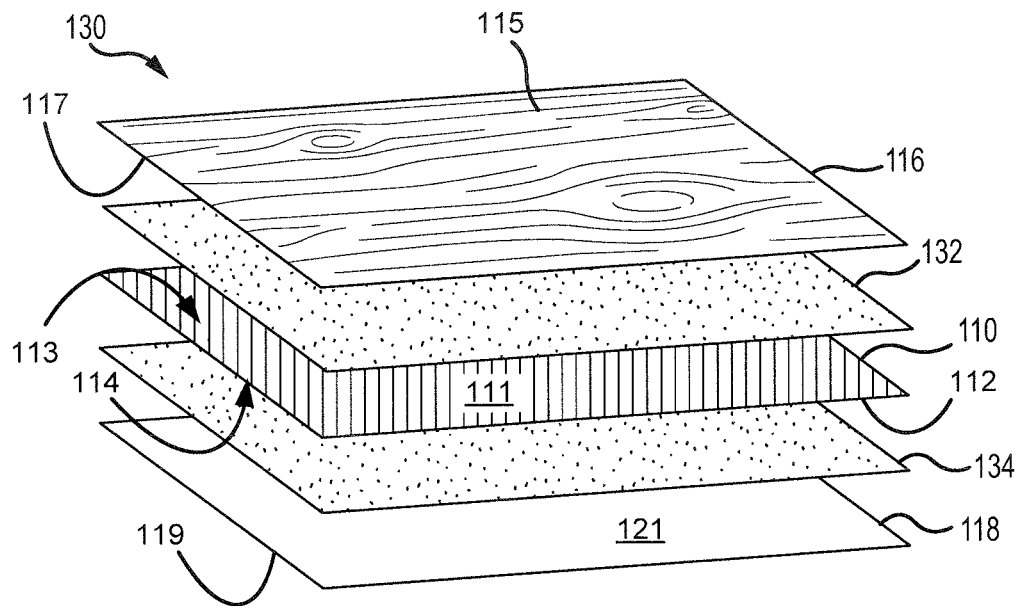
FIGS. 3A and 3B illustrate an assembly view and a cross sectional view, respectively, of a 3-ply veneer panel including a thermally conductive layer, in accordance with various embodiments.

With respect to FIGS. 3A and 3B and FIGS. 4A-4D, elements with like element numbering, as depicted in FIGS. 2A-2D, are intended to be the same and will not necessarily be repeated for the sake of clarity. With respect to FIGS. 4A-4D, elements with like element numbering, as depicted in FIG. 3A, are intended to be the same and will not necessarily be repeated for the sake of clarity.

Figure 1:
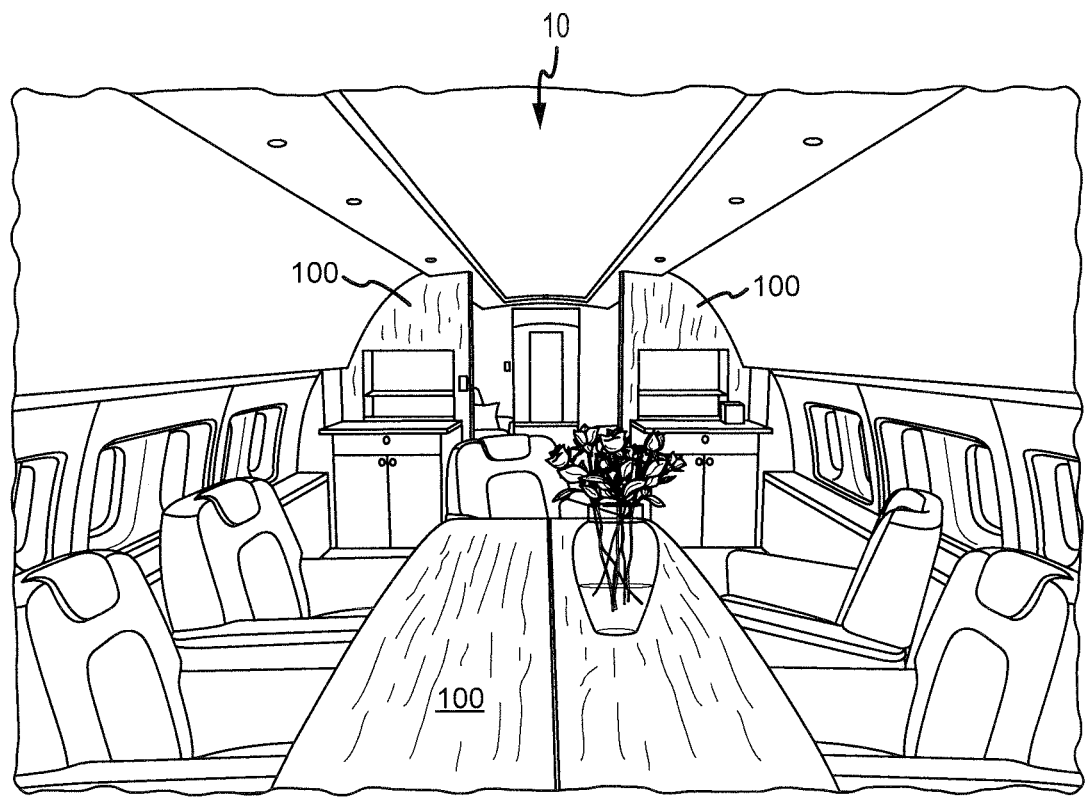
FIG. 1 illustrates an aircraft interior including various elements comprising 3-ply veneer panels, in accordance with various embodiments.

Referring now to FIG. 1, an aircraft interior 10 including various elements comprising aviation veneer panels 100 is shown, in accordance with various embodiments. Aviation veneer panels 100 may include 3-ply veneer panels, as described below, mounted or otherwise coupled to a substrate (e.g., cabinetry, tables, chairs, hand rails, etc.).

Referring now to FIGS. 2A-2D, formation of a 3-ply veneer panel comprising a thermally conductive layer is illustrated, according to various embodiments. With reference to FIG. 2A, a thermally conductive layer 110 is illustrated in cross section. Thermally conductive layer 110 includes a first surface 111 and a second surface 112 opposite first surface 111. In various embodiments, a thickness T1 of thermally conductive layer 110 extending from first surface 111 to second surface 112 may be between 0.0005 inches and 0.10 inches (i.e., between 0.0127 mm and 2.54 mm). In various embodiments, T1 may be between 0.001 inches and 0.015 inches (i.e., between 0.0254 mm and 0.381 mm). In various embodiments, T1 may be between 0.001 and 0.006 inches (i.e., between 0.0254 mm and 0.1524 mm). In various embodiments, T1 may be between 0.002 and 0.005 inches (i.e., between 0.0508 mm and 0.127 mm).

Thermally conductive layer 110 may comprise a material having a thermally conductivity of 10 W/m·K or greater. In various embodiments, thermally conductive layer 110 may comprise a metal. For example, thermally conductive layer 110 may comprise one or more layers of aluminum, copper, tin, stainless steel, titanium, alloys of the same, etc. In various embodiments, thermally conductive layer 110 may comprise one or more layers of a non-metal. For example, thermally conductive layer 110 may comprise one or more layers of graphite, carbon mat, carbon fiber mat, carbon nanotube mat, carbon felt, carbon paper, thermally conductive elastomers, thermoplastics, filled polymer, or other thermally conductive material. In various embodiments, thermally conductive layer 110 may include layers of differing materials. For example, thermally conductive layer 110 may comprise an aluminum foil layer and a stainless steel foil layer or an aluminum foil layer and a graphite layer.

In various embodiments, thermally conductive layer 110 may comprise a material having a first thermal conductivity in an in-plane direction (i.e., in a direction along the x-axis) and a second thermal conductivity in the through-plane direction (i.e., in a direction along the y-axis). In various embodiments, the first thermal conductivity (i.e., the in-plane thermal conductivity) may be greater than the second thermal conductivity (i.e., the through-plane thermal conductivity). For example, thermally conductive layer 110 may include a material having an in-plane thermal conductivity between 20 W/m·K and 500 W/m·K and a through-plane thermal conductivity between 2 W/m·K and 20 W/m·K. In various embodiments, thermally conductive layer 110 may include a material having an in-plane thermal conductivity between 20 W/m·K and 1,000 W/m·K and a through-plane thermal conductivity between 2 W/m·K and 20 W/m·K.

In various embodiments, thermally conductive layer 110 may be chemically treated to enhance a bonding capability of thermally conductive layer 110. In various embodiments, thermally conductive layer 110 may comprise a chemically treated metal. Stated another way, thermally conductive layer 110 may comprise a plurality of first vinyl groups chemically bonded to a first surface of thermally conductive layer 110. For example, with reference to FIG. 2B, thermally conductive layer 110 may comprise a metal (e.g., aluminum, copper, tin, stainless steel, titanium, alloys of the same, etc.) that has been treated with vinyl phosphoric acid. In various embodiments, thermally conductive layer 110 may comprise a chemically treated non-metal. For example, thermally conductive layer 110 may comprise a non-metal (e.g., graphite, carbon mat, carbon fiber mat, carbon nanotube mat, carbon felt, carbon paper, thermally conductive elastomers, thermoplastics, filled polymer, etc.) that has been treated with vinyl phosphoric acid. In various embodiments, prior to application of the vinyl phosphoric acid, thermally conductive layer 110 may be plasma treated or otherwise oxidized to form radicals on the surface of thermally conductive layer 110 and facilitate the bonding of the vinyl phosphoric acid. The vinyl phosphoric acid may be applied to thermally conductive layer 110 by spraying, rolling, brushing, or any other suitable application method.

Treating thermally conductive layer 110 with vinyl phosphoric acid may form a coating of vinyl groups chemically bonded to the surfaces of thermally conductive layer. Said differently, treating thermally conductive layer 110 with vinyl phosphoric acid may leave a plurality of first vinyl groups 113 chemically bonded to first surface 111 of thermally conductive layer 110 and a plurality of second vinyl groups 114 chemically bonded to second surface 112 of thermally conductive layer 110. A reaction between the phosphoric acid groups of the vinyl phosphoric acid and thermally conductive layer 110 may result in the bonding of the vinyl groups of the vinyl phosphoric acid to thermally conductive layer 110 (e.g., treating a thermally conductive layer 110, comprising a metal, with vinyl phosphoric acid may result in the phosphoric acid group of the vinyl phosphoric acid reacting and bonding with the native oxides on the metal's surface; the bonding of the phosphoric acid to the metal's surface also bonds the vinyl groups that are attached to the phosphoric acid to the surface of the metal).

With reference to FIG. 2C, an assembly view of a veneer panel 120 is shown, in accordance with various embodiments. Veneer panel 120 may comprise a face veneer 116, a backing layer 118, and a chemically treated thermally conductive layer 110 comprising a plurality of first vinyl groups 113 bonded to first surface 111 of thermally conductive layer 110 and a plurality of second vinyl groups 114 bonded to second surface 112 of thermally conductive layer 110. Face veneer 116 may include a first surface 115 (also referred to as a face surface) and a second surface 117 (also referred to as a back surface) opposite first surface 115. Face veneer 116 may be configured to face thermally conductive layer 110. In other words, back surface 117 of face veneer 116 may be oriented toward thermally conductive layer 110.

Face veneer 116 may comprise a thin layer of walnut, cherry, birch, rosewood, oak, maple, mahogany, hemlock, teak, walnut, or other wood species. Face veneer 116 may be manufactured from most wood species, common and exotic alike. Face veneer 116 may also be a manufactured product comprising one or more natural wood(s) and/or synthetic materials, referred to herein as "composite wood." In various embodiments, first surface 115 of face veneer 116 may be sanded to provide a smooth, decorative surface for finishing.

With momentary reference to FIG. 2D, in various embodiments, face veneer 116 of veneer panel 120 may have a thickness T2 ranging from 0.015 inches to 0.030 inches (i.e., from 0.38 mm to 0.76 mm). For example, face veneer 116 may comprise a thickness T2 of 0.02 inches (i.e., 0.508 mm). Veneer panel 120 may be formed in any dimensions, and may readily be made into rectangular 4 foot by 8 foot (i.e., 1.2 m by 2.4 m) panels. Veneer panel 120 may also be cut into smaller sizes or varied shapes, depending on the substrate (e.g., cabinet, table, rail, etc.) to which veneer panel 120 may be mounted.

Returning to FIG. 2C, in various embodiments, backing layer 118 may form the back surface of veneer panel 120. Backing layer 118 may have a first surface 119 (also referred to as a face surface) and a second surface 121 (also referred to as a back surface). Backing layer 118 may be configured to face thermally conductive layer 110. In other words, back surface 121 of backing layer 118 may be oriented toward thermally conductive layer 110. With momentary reference to FIG. 2D, in various embodiments, backing layer 118 may have a thickness T3 ranging from 0.015 inches to 0.030 inches (i.e., 0.38 mm to 0.76 mm). For example, backing layer 118 may comprise a thickness T3 of 0.02 inches (i.e., 0.508 mm).

Returning to FIG. 2C, backing layer 118 may be a thin layer of walnut, cherry, birch, rosewood, oak, maple, mahogany, hemlock, teak, walnut, poplar, or any other wood or composite wood species. In various embodiments, only one side of veneer panel 120 may be visible in the final product (i.e., backing layer 118 may be hidden from sight). Thus, backing layer 118 may be made from a less visually appealing and/or mismatched material. For example, backing layer 118 may comprise a poplar layer.

Using a wood material for backing layer 118, and particularly the same wood species as face veneer 116, may result in a more balanced coefficient of thermal expansion than other backing materials. In various embodiments, the grain of the wood of backing layer 118 may be aligned with the grain of face veneer 116 for flexibility. In various embodiments, the grain of the wood of backing layer 118 may be disposed roughly orthogonal to the grain of face veneer 116 for increased stiffness. Face surface 119 of backing layer 118 may be sanded to provide a smooth surface with a consistent thickness. In various embodiments, backing layer 118 may be made from fiber-reinforced composite, paper, felt, or another suitable material.

With reference to FIG. 2D, a heat and/or pressure treatment of veneer panel 120 (e.g., pressing veneer panel 120 inside a press machine) is illustrated, in accordance with various embodiments. Pressure P may be a compressive force applied uniformly and/or substantially uniformly across the outer surfaces of veneer panel 120 through face veneer 116 and backing layer 118. Veneer panel 120 may also be heated to reach a thermal threshold necessary to induce the vinyl groups (i.e., first vinyl groups 113 and second vinyl groups 114) bonded to thermally conductive layer 110 to crosslink with face veneer 116 and backing layer 118. For example, the first vinyl groups 113 bonded to first surface 111 of thermally conductive layer 110 may wet back surface 117 of face veneer. The second vinyl groups 114 bonded to second surface 112 of thermally conductive layer 110 may wet back surface 121 of backing layer 118. Upon heating, first vinyl groups 113 may crosslink and form strong bonds with face veneer 116, and second vinyl groups 114 may crosslink and form strong bonds with backing layer 118. Treating thermally conductive layer 110 with vinyl phosphoric acid may thus increase the adhesion and/or bond strength between face veneer 116 and thermally conductive layer 110 and/or between thermally conductive layer 110 and backing layer 118 to produce a veneer panel that may be resistant to delamination.

In various embodiments, veneer panel 120 may be run through a flex machine to introduce small micro cracks into veneer panel 120 by flexing the panel. The micro-cracks may not be visible to the naked eye but nonetheless may improve flexibility of the panel.

If desired, according to various embodiments, the veneer panel 120 comprising face veneer 116, thermally conductive layer 110, and backing layer 118 may be treated with a fire retardant chemical for fire protection such that veneer panel 120 may be incombustible. In various embodiments, veneer panel 120 may not be treated with fire retardant chemicals and may still be incombustible (i.e., comply with flammability regulations) given the thermal conductivity and fire resistant properties of thermally conductive layer 110. In various embodiments, the vinyl phosphoric acid that may be used to treat thermally conductive layer 110 may serve as intumescent flame retardant.

Referring now to FIG. 3A, an assembly view of a veneer panel 130 comprising thermally conductive layer 110 is illustrated, according to various embodiments. Veneer panel 130 may include face veneer 116, backing layer 118, and chemically treated thermally conductive layer 110 with first vinyl groups 113 bonded to first surface 111 of thermally conductive layer 110 and second vinyl groups 114 bonded to second surface 112 of thermally conductive layer 110. In various embodiments, an adhesive material 132 may be applied over back surface 117 of face veneer 116, i.e., between face veneer 116 and thermally conductive layer 110. In various embodiments, adhesive material 132 may comprise polyvinyl alcohol, epoxy resin, phenolic resin, or other suitable adhesive. In various embodiments, adhesive material 132 may be in the form of a thermoset adhesive, such as a phenolic glue film or a phenolic surface film. A phenolic glue film may allow adhesive material 132 to be cut in a sheet form and disposed between a back surface 117 of face veneer 116 and thermally conductive layer 110 during the layup process.

In various embodiments, an adhesive material 134 may be applied over back surface 121 of backing layer 118, i.e., between backing layer 118 and thermally conductive layer 110. In various embodiments, adhesive material 134 may comprise polyvinyl alcohol, epoxy resin, phenolic resin, or other suitable adhesive. In various embodiments, adhesive material 134 may be in the form of a thermoset adhesive, such as a phenolic glue film or a phenolic surface film. A phenolic glue film may allow adhesive material 134 to be cut in a sheet form and disposed between a back surface 121 of backing layer 118 and thermally conductive layer 110 during the layup process.

Adhesive material 132 and/or adhesive material 134 may be a continuous sheet cut into a shape to mirror the shape of face veneer 116 and the other layers of veneer panel 130. Thermally conductive layer 110 may be disposed between adhesive material 132 and adhesive material 134. Backing layer 118 may be disposed adjacent to adhesive material 134 to form the bottom surface of veneer panel 130. In that regard, backing layer 118 may provide support for veneer panel 130. Face veneer 116, adhesive material 132, thermally conductive layer 110, adhesive material 134, and backing layer 118 may each be a separate layer cut into the same shape and may be aligned prior to a heat pressing treatment to form the veneer panel 130. Veneer panel 130 may be formed in any dimensions, and readily be made into rectangular 4 foot by 8 foot (i.e., 1.2 m by 2.4 m) panel. Veneer panel 130 may also be cut into smaller sizes or varied shapes, depending on the substrate (e.g., cabinet, table, rail, etc.) to which veneer panel 130 may ultimately be mounted.

Figure 3B:
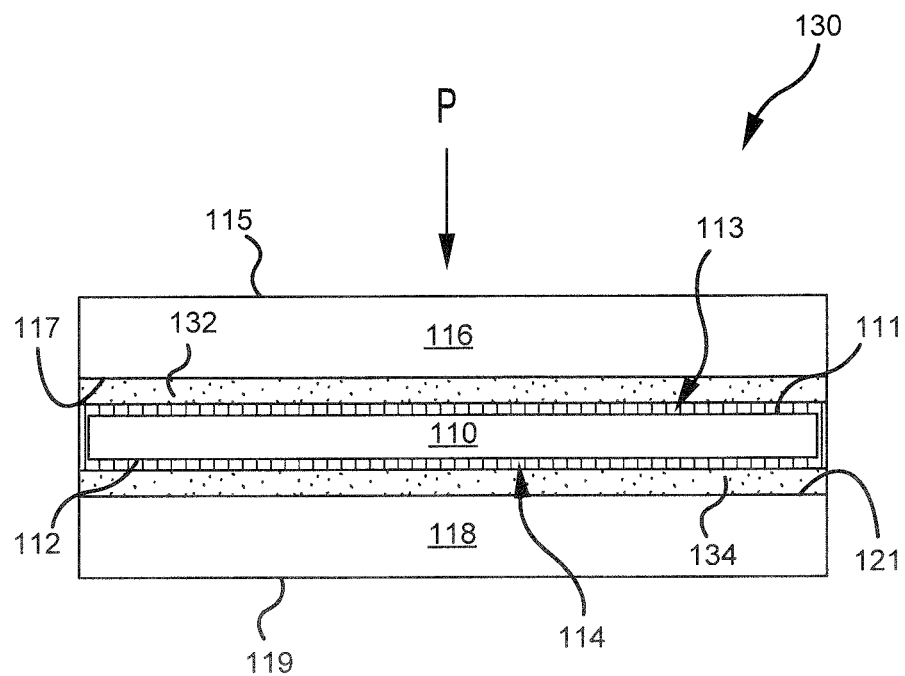

With reference to FIG. 3B, a heat and/or pressure treatment of veneer panel 130 (e.g., pressing veneer panel 130 inside a press machine) is illustrated, in accordance with various embodiments. Pressure P may be a compressive force applied uniformly and/or substantially uniformly across the outer surfaces of veneer panel 130 through face veneer 116 and backing layer 118. In various embodiments, veneer panel 130 may be heated to reach a thermal threshold associated with setting thermosetting adhesive materials.

In various embodiments, in response to the increased temperature and pressure, adhesive material 132 may penetrate into fibers of the wood used for face veneer 116. Thermally conductive layer 110 and face veneer 116 may press together and contact one another or have a thin layer of adhesive remaining between one another. Similarly, in response to the increased temperature and pressure, adhesive material 134 may penetrate into the material (e.g., wood) used for backing layer 118. Thermally conductive layer 110 and backing layer 118 may press together and contact one another or have a thin layer of adhesive remaining between one another. Adhesive material 132 and adhesive material 134 may then thermoset and initiate crosslink bonds.

In various embodiments, veneer panel 130 may be heated to reach a thermal threshold necessary to induce the vinyl groups (i.e., first vinyl groups 113 and second vinyl groups 114) bonded to thermally conductive layer 110 to crosslink with adhesive material 132 and/or adhesive material 134. For example, the first vinyl groups 113 bonded to first surface 111 of thermally conductive layer 110 may wet adhesive material 132 and/or back surface 117 of face veneer 116. The second vinyl groups 114 bonded to second surface 112 of thermally conductive layer 110 may wet adhesive material 134 and/or back surface 121 of backing layer 118. Upon heating, first vinyl groups 113 may crosslink and form strong bonds with adhesive material 132 and/or face veneer 116, and second vinyl groups 114 may crosslink and form strong bonds with adhesive material 134 and/or backing layer 118. Treating thermally conductive layer 110 with vinyl phosphoric acid may thus increase the adhesion and/or bond strength between face veneer 116 and thermally conductive layer 110 and/or between thermally conductive layer 110 and backing layer 118 to produce a veneer panel that may be resistant to delamination.

In various embodiments, veneer panel 130 may be run through a flex machine to introduce small micro cracks into veneer panel 130 by flexing the panel. The micro-cracks may not be visible to the naked eye but nonetheless may improve flexibility of the panel.

If desired, according to various embodiments, the veneer panel 130 may be treated with a fire retardant chemical for fire protection such that veneer panel 130 may be incombustible. In various embodiments, veneer panel 130 may not be treated with fire retardant chemicals and may still be incombustible (i.e., comply with flammability regulations) given the thermal conductivity and fire resistant properties of thermally conductive layer 110. For example, in various embodiments, the vinyl phosphoric acid that may be used to treat thermally conductive layer 110 may serve as intumescent flame retardant. In various embodiments, nitrogen-based flame retardant compounds, for example, polyethylenimine, melamine, melamine cyanurate, etc., may be added to adhesive material 132 and/or adhesive material 134 and may serve as an intumescent flame retardant.

Figure 4A:
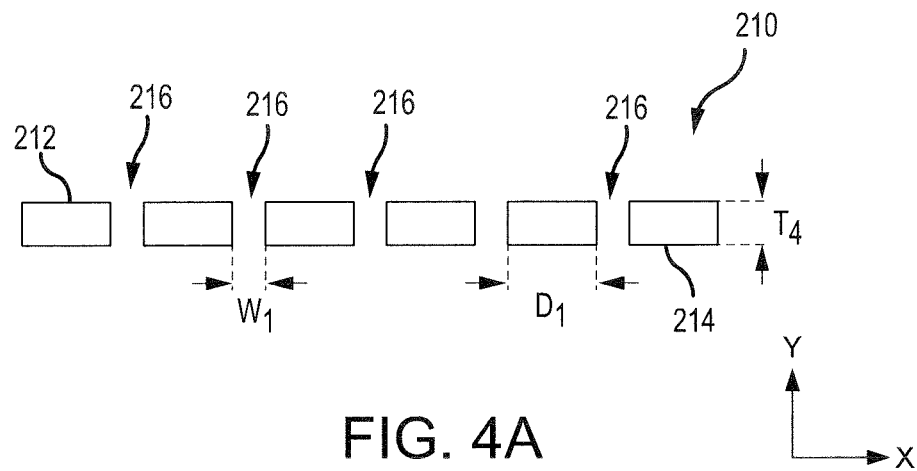
FIGS. 4A and 4B illustrate a thermally conductive layer for incorporation into 3-ply veneer panels, in accordance with various embodiments.

With reference to FIG. 4A, a thermally conductive layer 210 is illustrated in cross section. Thermally conductive layer 210 includes a first surface 212 and a second surface 214 opposite first surface 212. In various embodiments, a thickness T4 of thermally conductive layer 210 extending from first surface 212 to second surface 214 may be between 0.0005 inches and 0.10 inches (i.e., between 0.0127 mm and 2.54 mm). In various embodiments, T4 may be between 0.001 inches and 0.015 inches (i.e., between 0.0254 mm and 0.381 mm). In various embodiments, T4 may be between 0.001 and 0.006 inches (i.e., between 0.0254 mm and 0.1524 mm). In various embodiments, T4 may be between 0.002 and 0.005 inches (i.e., between 0.0508 mm and 0.127 mm).

Thermally conductive layer 210 may comprise a material having a thermally conductivity of 10 W/m·K or greater. In various embodiments, thermally conductive layer 210 may comprise a metal. For example, thermally conductive layer 210 may comprise one or more layers of aluminum, copper, tin, stainless steel, titanium, alloys of the same, etc. In various embodiments, thermally conductive layer 210 may comprise a non-metal. For example, thermally conductive layer 210 may comprise one or more layers of graphite, carbon mat, carbon fiber, paper, cloth, or other thermally conductive material. In various embodiments, thermally conductive layer 210 may include layers of differing materials. For example, thermally conductive layer 210 may comprise an aluminum foil layer and a graphite layer, or an aluminum foil layer and a stainless steel foil layer.

In various embodiments, thermally conductive layer 210 may comprise a material having a first thermal conductivity in an in-plane direction (i.e., in a direction along the x-axis) and a second thermal conductivity in the through-plane direction (i.e., in a direction along the y-axis). In various embodiments, the first thermal conductivity (i.e., the in-plane thermal conductivity) may be greater than the second thermal conductivity (i.e., the through-plane thermal conductivity). For example, thermally conductive layer 210 may include a material having an in-plane thermal conductivity between 20 W/m·K and 500 W/m·K and a through-plane thermal conductivity between 2 W/m·K and 20 W/m·K. In various embodiments, thermally conductive layer 210 may include a material having an in-plane thermal conductivity between 20 W/m·K and 1,000 W/m·K and a through-plane thermal conductivity between 2 W/m·K and 20 W/m·K.

In various embodiments, a plurality of openings 216 may be formed through thermally conductive layer 210. Openings 216 extend from first surface 212 to second surface 214 of thermally conductive layer 210. Openings 216 each include a width or diameter W1. In various embodiments, W1 may be 0.04 inches or less (i.e., 1.0 mm or less). In various embodiments, openings 216 may be formed by punching thermally conductive layer 210.

Figure 4B:
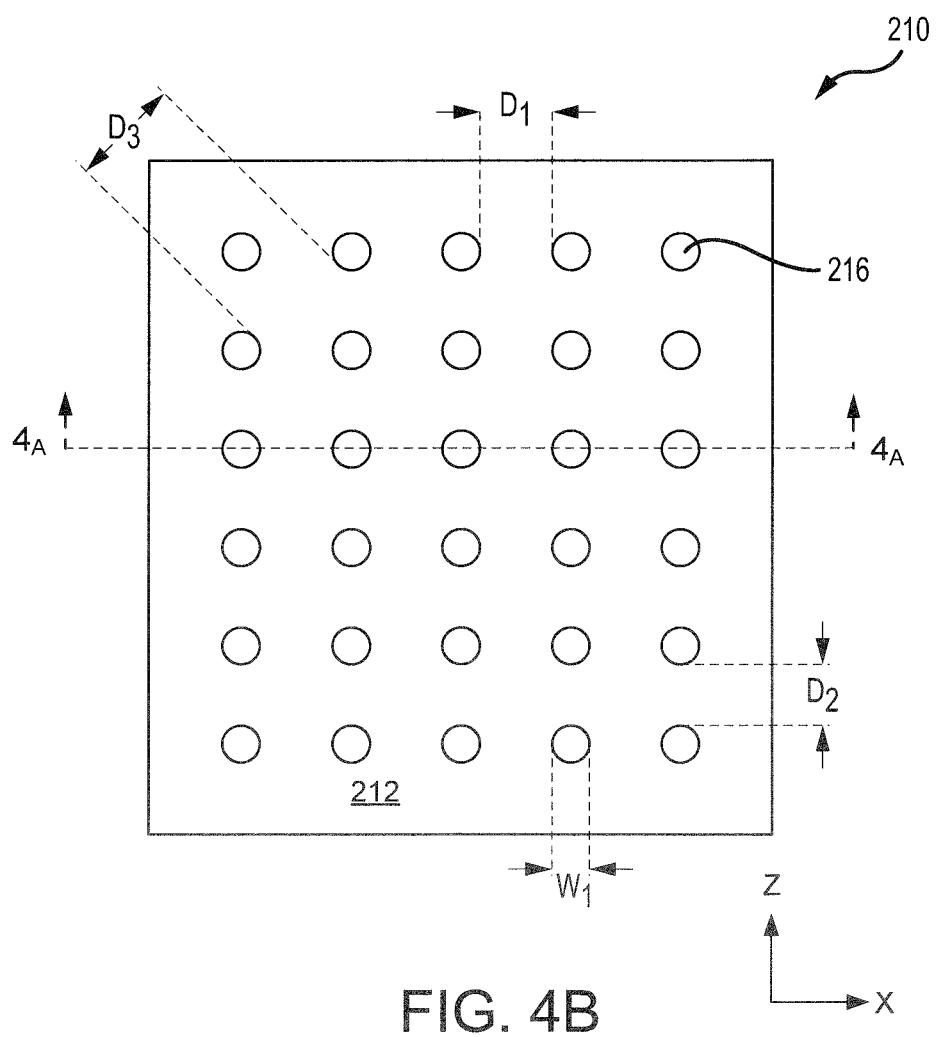

With reference to FIG. 4B, a plan view of thermally conductive layer 210 is illustrated, in accordance with various embodiments. In various embodiments, openings 216 may be configured to be within 0.4 inches (i.e., 1.0 cm) of each other. In other words, a distance between any two openings 216 may be 0.4 inches (i.e., 1.0 cm) or less. For example, a distance D1, between openings that are adjacent along the x-axis, may be 0.4 inches (i.e., 1.0 cm) or less; a distance D2, between openings that are adjacent along the z-axis, may be 0.4 inches (i.e., 1.0 cm) or less; a distance D3, between openings that are diagonally adjacent along the plane formed by the z-axis and x-axis may be 0.4 inches (i.e., 1.0 cm) or less.

In various embodiments, openings 216 comprise between 0.5% and 10% of a total surface area of first surface 212 of thermally conductive layer 210. In various embodiments, a ratio of a distance between adjacent openings 216 to width W1 of openings 216 may be between 10:1 and 25:1. Width W1 of openings 216 and/or the number of openings formed through thermally conductive layer 210 may be related to a thermal conductivity of thermally conductive layer 210. For example, a thermally conductive layer 210 comprising a material with a higher thermal conductivity (e.g., 200 W/m·K or greater) may include a greater number of openings 216 and/or openings 216 having a greater width W1 than a thermally conductive layer 210 comprising a material with a lower thermal conductivity (e.g., less than 200 W/m·K). In other words, openings 216 may comprise a greater percentage (e.g., 5%-10%) of the surface area of first surface 212 of a thermally conductive layer 210 comprising a material with a high thermal conductivity (e.g., 200 W/m·K or greater).

Figure 4C:
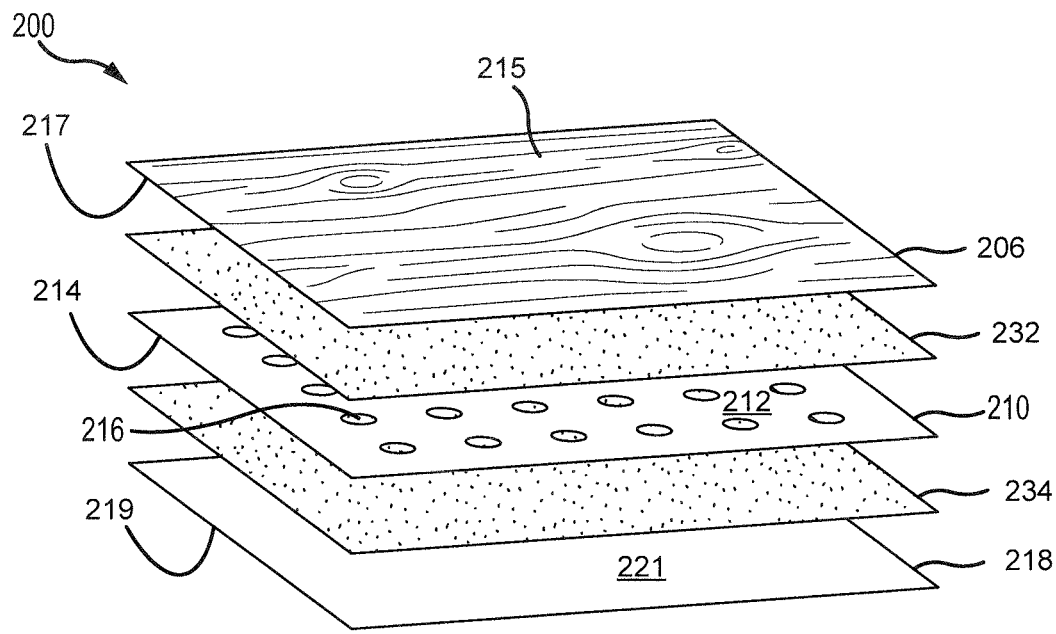
FIGS. 4C and 4D illustrate an assembly view and a cross sectional view, respectively, of a 3-ply veneer panel including a thermally conductive layer; in accordance with various embodiments.

Referring now to FIG. 4C, an assembly view of a veneer panel 200 comprising thermally conductive layer 210 is illustrated, according to various embodiments. Veneer panel 200 may include a face veneer 206, thermally conductive layer 210 with openings 216, and a backing layer 318. Face veneer 206 may include a first surface 215 (also referred to as a face surface) and a second surface 217 (also referred to as a back surface) opposite first surface 215. Face veneer 206 may be configured to face thermally conductive layer 210. In other words, back surface 217 of face veneer 206 may be oriented toward thermally conductive layer 210.

Face veneer 206 may comprise a thin layer of walnut, cherry, birch, rosewood, oak, maple, mahogany, hemlock, teak, walnut, or other wood species. Face veneer 206 may be manufactured from most wood species, common and exotic alike. Face veneer 206 may also be a manufactured product comprising one or more natural wood(s) and/or synthetic materials, referred to herein as "composite wood." In various embodiments, first surface 215 of face veneer 206 may be sanded to provide a smooth, decorative surface for finishing.

Figure 4D:
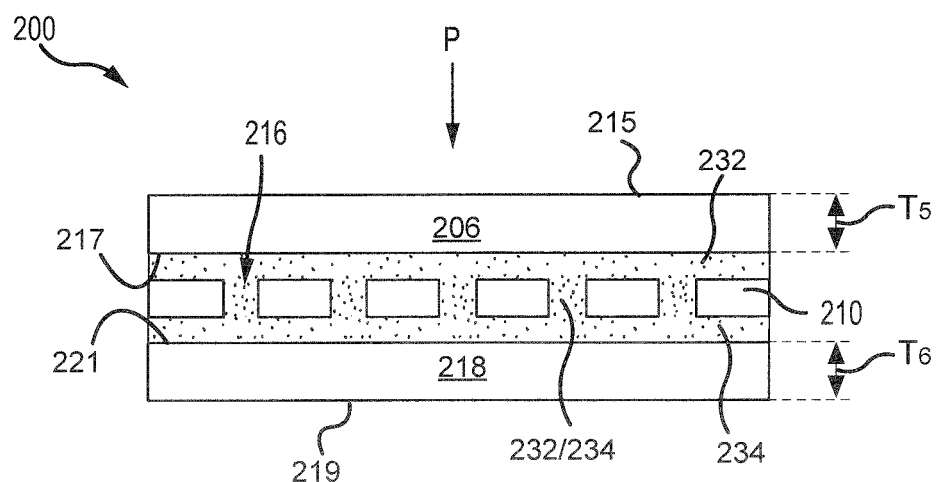

With momentary reference to FIG. 4D, in various embodiments, face veneer 206 may have a thickness T5 ranging from 0.015 inches to 0.030 inches (i.e., from 0.38 mm to 0.76 mm). For example, face veneer 206 may comprise a thickness T5 of 0.02 inches (i.e., 0.508 mm).

Returning to FIG. 4C, in various embodiments, backing layer 218 may form the back surface of veneer panel 200. Backing layer 218 may have a first surface 219 (also referred to as a face surface) and a second surface 221 (also referred to as a back surface). Backing layer 218 may be configured to face thermally conductive layer 210. In other words, back surface 221 of backing layer 218 may be oriented toward thermally conductive layer 210.

Backing layer 218 may be a thin layer of walnut, cherry, birch, rosewood, oak, maple, mahogany, hemlock, teak, walnut, poplar, or any other wood or composite wood species. In various embodiments, only one side of veneer panel 200 may be visible in the final product (i.e., backing layer 218 may be hidden from sight). Thus, backing layer 218 may be made from a less visually appealing and/or mismatched material. For example, backing layer 218 may comprise a poplar layer. Using a wood material for backing layer 218, and particularly the same wood species as face veneer 206, may result in a more balanced coefficient of thermal expansion than other backing materials. In various embodiments, the grain of the wood of backing layer 218 may be aligned with the grain of face veneer 206 for flexibility. In various embodiments, the grain of the wood of backing layer 218 may be disposed roughly orthogonal to the grain of face veneer 206 for increased stiffness. Face surface 219 of backing layer 218 may be sanded to provide a smooth surface with a consistent thickness. In various embodiments, backing layer 218 may be made from fiber-reinforced composite, paper, felt, or another suitable material.

With momentary reference to FIG. 4D, in various embodiments, backing layer 218 may have a thickness T6 ranging from 0.015 inches to 0.030 inches (i.e., 0.38 mm to 0.76 mm). For example, backing layer 218 may comprise a thickness T6 of 0.02 inches (i.e., 0.508 mm).

Returning to FIG. 4C, in various embodiments, adhesive material 232 may be applied over back surface 217 of face veneer 206, i.e., between face veneer 206 and thermally conductive layer 210. In various embodiments, adhesive material 232 may comprise polyvinyl alcohol, epoxy resin, phenolic resin, or other suitable adhesive. In various embodiments, adhesive material 232 may be in the form of a thermoset adhesive, such as a phenolic glue film or a phenolic surface film. A phenolic glue film may allow adhesive material 232 to be cut in a sheet form and disposed between a back surface 217 of face veneer 206 and thermally conductive layer 210 during the layup process.

In various embodiments, an adhesive material 234 may be applied over back surface 221 of backing layer 218, i.e., between backing layer 218 and thermally conductive layer 210. Adhesive material 234 may comprise polyvinyl alcohol, epoxy resin, phenolic resin, or other suitable adhesive. In various embodiments, adhesive material 234 may be in the form of a thermoset adhesive, such as a phenolic glue film or a phenolic surface film. A phenolic glue film may allow adhesive material 234 to be cut in a sheet form and disposed between a back surface 221 of backing layer 218 and thermally conductive layer 210 during the layup process.

Adhesive material 232 and/or adhesive material 234 may be a continuous sheet cut into a shape to mirror the shape of face veneer 206 and the other layers of veneer panel 200. Thermally conductive layer 210 with openings 216 may be disposed between adhesive material 232 and adhesive material 234. Backing layer 218 may be disposed adjacent adhesive material 234 to form the bottom surface of veneer panel 200. In that regard, backing layer 218 may provide support for veneer panel 200. Face veneer 206, adhesive material 232, thermally conductive layer 210, adhesive material 234, and backing layer 218 may each be a separate layer cut into the same shape and be aligned prior to a heat pressing treatment to form the veneer panel 200. Veneer panel 200 may be formed in any dimensions, and readily be made into rectangular 4 foot by 8 foot (i.e., 1.2 m by 2.4 m) panels. Veneer panel 200 may also be cut into smaller sizes or varied shapes, depending on the substrate (e.g., cabinet, table, rail, etc.) to which veneer panel 200 may ultimately be mounted.

With reference to FIG. 4D, a heat and/or pressure treatment of veneer panel 200 (e.g., pressing veneer panel 200 inside a press machine) is illustrated, in accordance with various embodiments. Pressure P may be a compressive force applied uniformly and/or substantially uniformly across the outer surfaces of veneer panel 200 through face veneer 206 and backing layer 218. In various embodiments, veneer panel 200 may be heated to reach a thermal threshold associated with setting thermosetting adhesive materials.

In various embodiments, in response to the increased temperature and pressure, adhesive material 232 may penetrate into fibers of the wood used for face veneer 206 and into openings 216 of thermally conductive layer 210. Thermally conductive layer 210 and face veneer 206 may press together and contact one another or have a thin layer of adhesive remaining between one another. Similarly, in response to the increased temperature and pressure, adhesive material 234 may penetrate into the material (e.g., wood) used for backing layer 218 and into openings 216 of thermally conductive layer 210. Thermally conductive layer 210 and backing layer 218 may press together and contact one another or have a thin layer of adhesive remaining between one another. Adhesive material 232 and adhesive material 234 may contact one another and/or mix within openings 216. Thus, adhesive material 234 may extend through openings 216 to contact back surface 217 of face veneer 206 and penetrate into fibers of the wood used for face veneer 206. Adhesive material 232 may extend through openings 216 to contact back surface 221 of backing layer 218 and penetrate into fibers of the material (e.g., wood) used for backing layer 218. Adhesive material 232 and adhesive material 234 may then thermoset and initiate cross-linking bonds. Openings 216 may thus allow for an increased adhesion and/or bonding strength between face veneer 206, thermally conductive layer 210, and/or backing layer 218, and produce a veneer panel that may be resistant to delamination.

In various embodiments, veneer panel 200 may be run through a flex machine to introduce small micro cracks into veneer panel 200 by flexing the panel. The micro-cracks may not be visible to the naked eye but nonetheless may improve flexibility of the panel.

If desired, according to various embodiments, the veneer panel 200 may be treated with a fire retardant chemical for fire protection such that veneer panel 200 may be incombustible. In various embodiments, veneer panel 200 may not be treated with fire retardant chemicals and may still be incombustible (i.e., comply with flammability regulations) given the thermal conductivity and fire resistant properties of thermally conductive layer 210. In various embodiments, nitrogen-based flame retardant compounds, for example, polyethylenimine, melamine, melamine cyanurate, etc., may be added to adhesive material 232 and/or adhesive material 234 and may serve as an intumescent flame retardant.

Figure 5A:
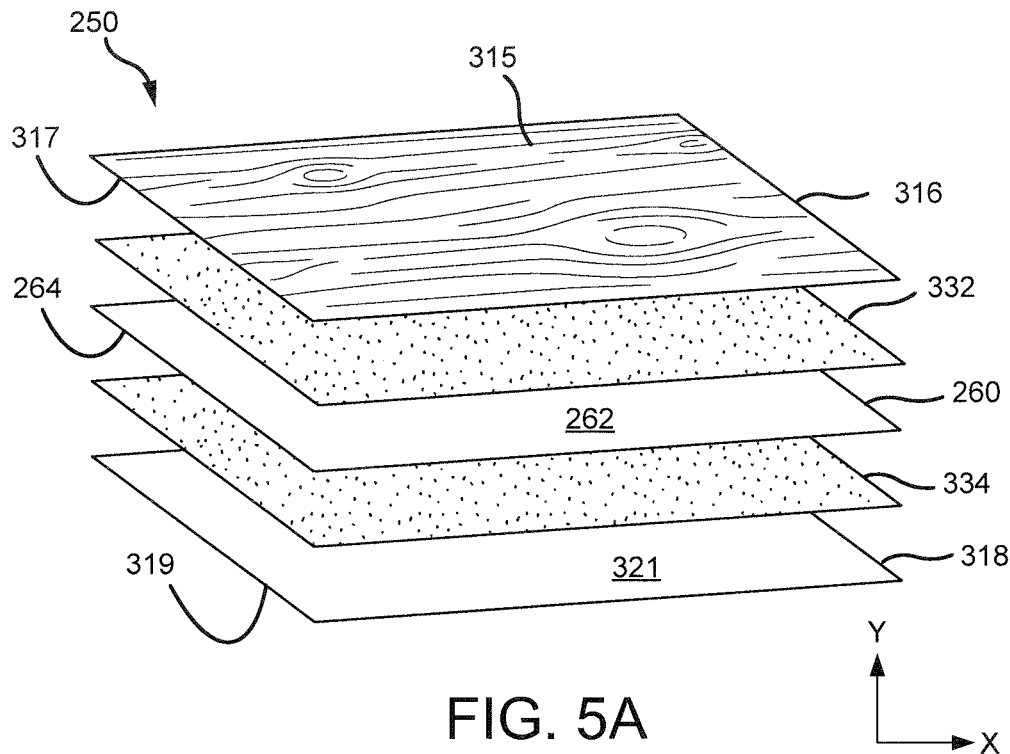
FIGS. 5A and 5B illustrate an assembly view and a cross sectional view, respectively, of a 3-ply veneer panel including a thermally conductive layer, in accordance with various embodiments.

Referring now to FIG. 5A, an assembly view of a veneer panel 250 comprising a thermally conductive layer 260 is illustrated, according to various embodiments. Veneer panel 250 may include a face veneer 316, thermally conductive layer 260, and a backing layer 318.

Thermally conductive layer 260 includes a first surface 262 and a second surface 264 opposite first surface 262. In various embodiments, with momentary reference to FIG. 5B, a thickness T7 of thermally conductive layer 260 extending from first surface 262 to second surface 264 may be between 0.0005 and 0.002 inches (i.e., between 0.0127 mm and 0.0508 mm). In various embodiments, T7 may be between 0.001 inches and 0.002 inches (i.e., between 0.0254 mm and 0.0508 mm). In various embodiments, T7 may be between 0.004 inches and 0.10 inches (i.e., between 0.1016 mm and 2.54 mm). In various embodiments, T7 may be between 0.004 inches and 0.015 inches (i.e., between 0.1016 mm and 0.381 mm). In various embodiments, T7 may be between 0.004 inches and 0.007 inches (i.e., between 0.1016 mm and 0.1778 mm).

Returning to FIG. 5A, thermally conductive layer 260 may comprise a material having a thermally conductivity of 10 W/m·K or greater. In various embodiments, thermally conductive layer 260 may comprise a metal. For example, thermally conductive layer 260 may comprise one or more layers of aluminum, copper, tin, stainless steel, titanium, alloys of the same, etc. In various embodiments, thermally conductive layer 260 may comprise a non-metal. For example, thermally conductive layer 260 may comprise one or more layers of graphite, carbon mat, carbon fiber mat, carbon nanotube mat, carbon felt, carbon paper, thermally conductive elastomers, thermoplastics, filled polymer, or other non-metal thermally conductive material. In various embodiments, thermally conductive layer 260 may include layers of differing materials. For example, thermally conductive layer 260 may comprise an aluminum foil layer and a stainless steel foil layer or an aluminum foil layer and a graphite layer.

In various embodiments, thermally conductive layer 260 may comprise a material having a first thermal conductivity in an in-plane direction (i.e., in a direction along the x-axis) and a second thermal conductivity in the through-plane direction (i.e., in a direction along the y-axis). In various embodiments, the first thermal conductivity (i.e., the in-plane thermal conductivity) may be greater than the second thermal conductivity (i.e., the through-plane thermal conductivity). For example, thermally conductive layer 260 may include a material having an in-plane thermal conductivity between 20 W/m·K and 500 W/m·K and a through-plane thermal conductivity between 2 W/m·K and 20 W/m·K. In various embodiments, thermally conductive layer 260 may include a material having an in-plane thermal conductivity between 20 W/m·K and 1,000 W/m·K and a through-plane thermal conductivity between 2 W/m·K and 20 W/m·K.

Face veneer 316 may include a first surface 315 (also referred to as a face surface) and a second surface 317 (also referred to as a back surface) opposite first surface 315. Face veneer 316 may be configured to face thermally conductive layer 260. In other words, back surface 317 of face veneer 316 may be oriented toward thermally conductive layer 260.

Face veneer 316 may comprise a thin layer of walnut, cherry, birch, rosewood, oak, maple, mahogany, hemlock, teak, walnut, or other wood species. Face veneer 316 may be manufactured from most wood species, common and exotic alike. Face veneer 316 may also be a manufactured product comprising one or more natural wood(s) and/or synthetic materials, referred to herein as "composite wood." In various embodiments, first surface 315 of face veneer 316 may be sanded to provide a smooth, decorative surface for finishing.

Figure 5B:
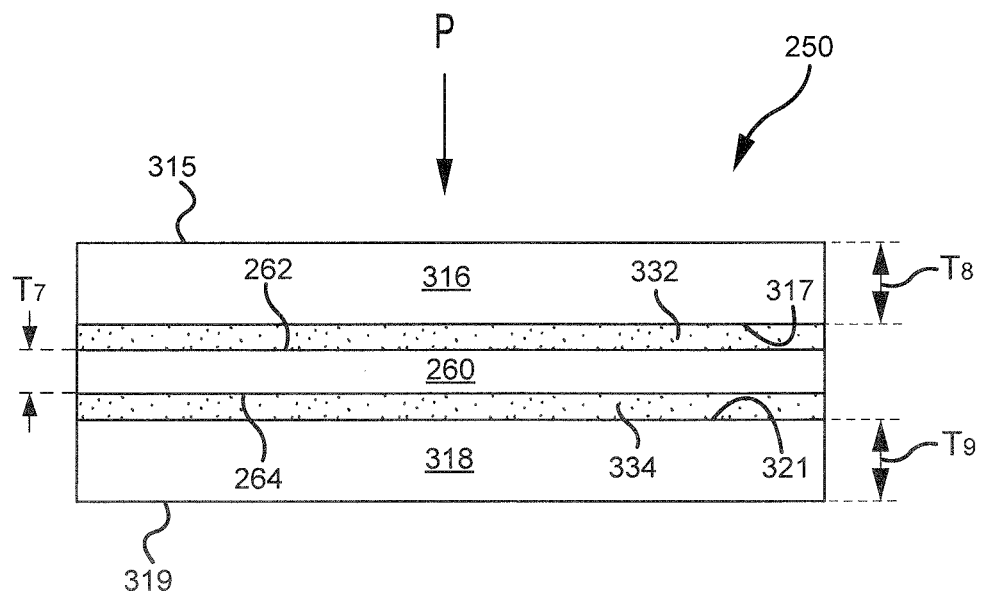

With momentary reference to FIG. 5B, in various embodiments, face veneer 316 may have a thickness T8 ranging from 0.015 inches to 0.030 inches (i.e., from 0.38 mm to 0.76 mm). For example, face veneer 316 may comprise a thickness T8 of 0.02 inches (i.e., 0.508 mm).

Returning to FIG. 5A, in various embodiments, backing layer 318 may form the back surface of veneer panel 250. Backing layer 318 may have a first surface 319 (also referred to as a face surface) and a second surface 321 (also referred to as a back surface). Backing layer 318 may be configured to face thermally conductive layer 260. In other words, back surface 321 of backing layer 318 may be oriented toward thermally conductive layer 260.

Backing layer 318 may be a thin layer of walnut, cherry, birch, rosewood, oak, maple, mahogany, hemlock, teak, walnut, poplar, or any other wood or composite wood species. In various embodiments, only one side of veneer panel 250 may be visible in the final product (i.e., backing layer 218 may be hidden from sight). Thus, backing layer 318 may be made from a less visually appealing and/or mismatched material. For example, backing layer 318 may comprise a poplar layer. Using a wood material for backing layer 318, and particularly the same wood species as face veneer 316, may result in a more balanced coefficient of thermal expansion than other backing materials. In various embodiments, the grain of the wood of backing layer 318 may be aligned with the grain of face veneer 316 for flexibility. In various embodiments, the grain of the wood of backing layer 318 may be disposed roughly orthogonal to the grain of face veneer 316 for increased stiffness. Face surface 319 of backing layer 318 may be sanded to provide a smooth surface with a consistent thickness. In various embodiments, backing layer 318 may be made from fiber-reinforced composite, paper, felt, or another suitable material.

With momentary reference to FIG. 5B, in various embodiments, backing layer 318 may have a thickness T9 ranging from 0.015 inches to 0.030 inches (i.e., 0.38 mm to 0.76 mm). For example, backing layer 318 may comprise a thickness T9 of 0.02 inches (i.e., 0.508 mm).

Returning to FIG. 5A, in various embodiments, an adhesive material 332 may be applied over back surface 317 of face veneer 316, i.e., between face veneer 316 and thermally conductive layer 260. Adhesive material 332 may comprise polyvinyl alcohol, epoxy resin, phenolic resin, or other suitable adhesive. In various embodiments, adhesive material 332 may be in the form of a thermoset adhesive, such as a phenolic glue film or a phenolic surface film. A phenolic glue film may allow adhesive material 332 to be cut in a sheet form and disposed between a back surface 317 of face veneer 316 and thermally conductive layer 260 during the layup process.

In various embodiments, an adhesive material 334 may be applied over back surface 321 of backing layer 318, i.e., between backing layer 318 and thermally conductive layer 360. Adhesive material 334 may comprise polyvinyl alcohol, epoxy resin, phenolic resin, or other suitable adhesive. In various embodiments, adhesive material 334 may be in the form of a thermoset adhesive, such as a phenolic glue film or a phenolic surface film. A phenolic glue film may allow adhesive material 334 to be cut in a sheet form and disposed between a back surface 321 of backing layer 318 and thermally conductive layer 260 during the layup process.

Adhesive material 332 and/or adhesive material 334 may be a continuous sheet cut into a shape to mirror the shape of face veneer 316 and the other layers of veneer panel 250. Thermally conductive layer 260 may be disposed between adhesive material 332 and adhesive material 334. Backing layer 318 may be disposed adjacent adhesive material 334 to form the bottom surface of veneer panel 250. In that regard, backing layer 318 may provide support for veneer panel 250. Face veneer 316, adhesive material 332, thermally conductive layer 260, adhesive material 334, and backing layer 318 may each be a separate layer cut into the same shape and may be aligned prior to a heat pressing treatment to form the veneer panel 250. Veneer panel 250 may be formed in any dimensions, and readily be made into rectangular 4 foot by 8 foot (i.e., 1.2 m by 2.4 m) panel. Veneer panel 250 may also be cut into smaller sizes or varied shapes, depending on the substrate (e.g., cabinet, table, rail, etc.) to which veneer panel 250 may ultimately be mounted.

With reference to FIG. 5B, a heat and/or pressure treatment of veneer panel 250 (e.g., pressing veneer panel 250 inside a press machine) is illustrated, in accordance with various embodiments. Pressure P may be a compressive force applied uniformly and/or substantially uniformly across the outer surfaces of veneer panel 250 through face veneer 316 and backing layer 318. In various embodiments, veneer panel 250 may be heated to reach a thermal threshold associated with setting thermosetting adhesive materials.

In various embodiments, in response to the increased temperature and pressure, adhesive material 332 may penetrate into fibers of the wood used for face veneer 316. Thermally conductive layer 260 and face veneer 316 may press together and contact one another or have a thin layer of adhesive remaining between one another. Similarly, in response to the increased temperature and pressure, adhesive material 334 may penetrate into the material (e.g., wood) used for backing layer 318. Thermally conductive layer 260 and backing layer 318 may press together and contact one another or have a thin layer of adhesive remaining between one another. Adhesive material 332 and adhesive material 334 may then thermoset and initiate crosslink bonds.

In various embodiments, veneer panel 250 may be run through a flex machine to introduce small micro cracks into veneer panel 250 by flexing the panel. The micro-cracks may not be visible to the naked eye but nonetheless may improve flexibility of the panel.

If desired, according to various embodiments, the veneer panel 250 may be treated with a fire retardant chemical for fire protection such that veneer panel 250 may be incombustible. In various embodiments, veneer panel 250 may not be treated with fire retardant chemicals and may still be incombustible (i.e., comply with flammability regulations) given the thermal conductivity and fire resistant properties of thermally conductive layer 260. In various embodiments, nitrogen-based flame retardant compounds, for example, polyethylenimine, melamine, melamine cyanurate, etc., may be added to adhesive material 332 and/or adhesive material 334 and may serve as an intumescent flame retardant.

Figure 6:
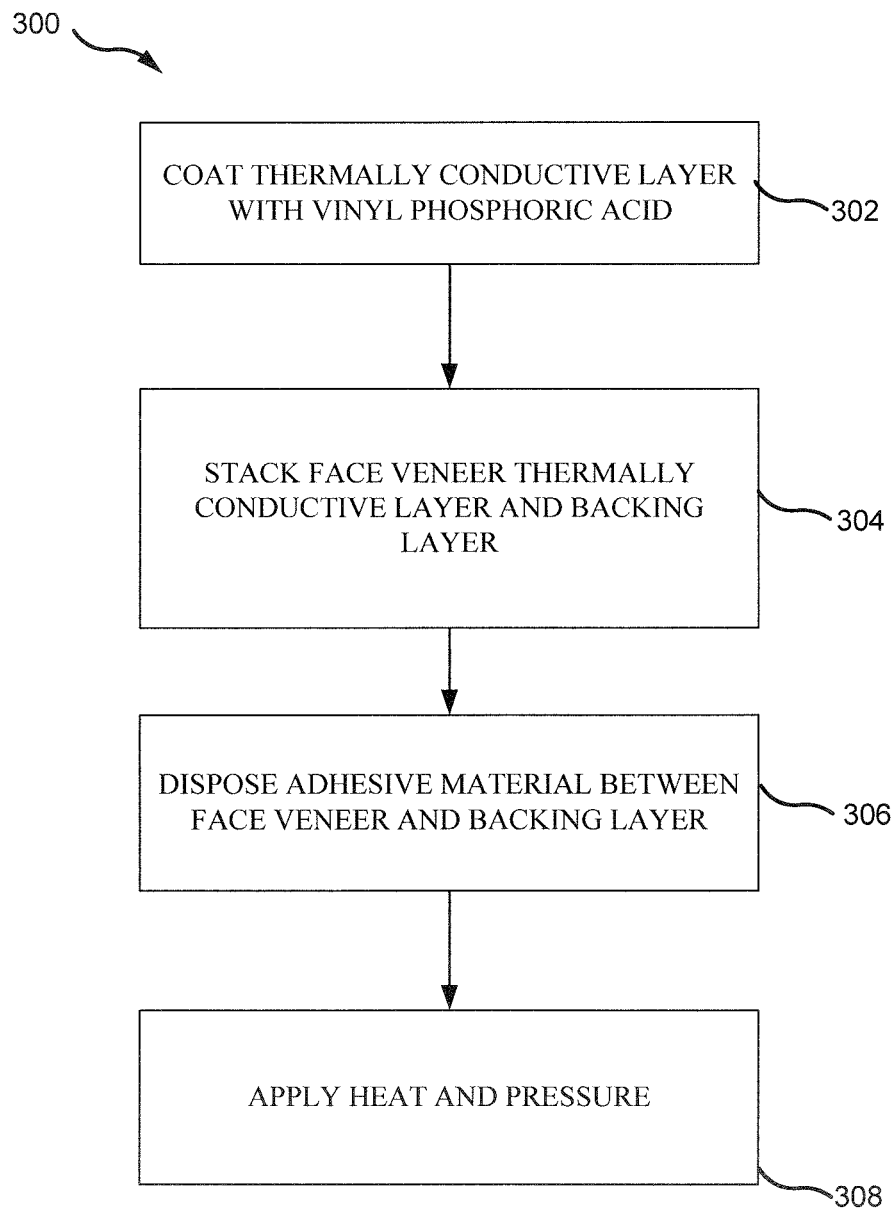
FIG. 6 illustrates a flow diagram of a method of making a veneer panel including a thermally conductive layer, according to various embodiments.

With reference to FIG. 6, a method 300 of making a veneer panel may comprise coating a thermally conductive layer with a vinyl phosphoric acid (step 302). Method 300 may comprise stacking a face veneer, a thermally conductive layer, and a backing layer (step 304). Method 300 may further comprise disposing an adhesive material between the face veneer and the backing layer (step 306). Method 300 may comprise applying heat and pressure to the face veneer, the thermally conductive layer, and the backing layer (step 308).

In various embodiments, with combined reference to FIG. 3B and FIG. 5, step 302 may comprise coating thermally conductive layer 110 with a vinyl phosphoric acid. Step 304 may comprise stacking face veneer 116, thermally conductive layer 110, and backing layer 118. Step 306 may comprise disposing adhesive material 132 between face veneer 116 and backing layer 118. Step 308 may comprise applying heat and pressure P to face veneer 116, thermally conductive layer 110, and backing layer 118.

Figure 7:
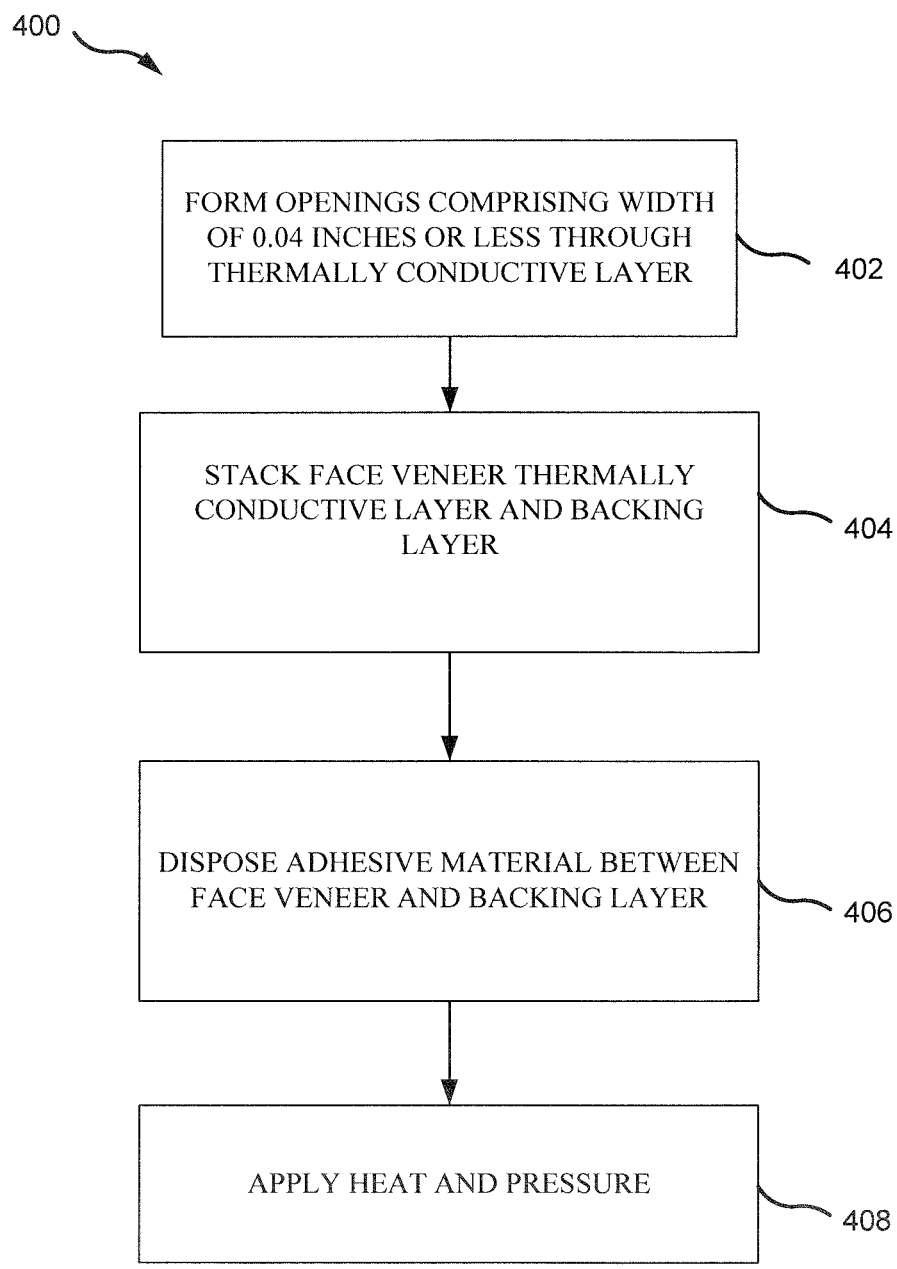
FIG. 7 illustrates a flow diagram of a method of making a veneer panel including a thermally conductive layer, according to various embodiments.

With reference to FIG. 7, a method 400 of making a veneer panel may comprise forming a plurality of openings comprising a width of 0.04 inches or less through a thermally conductive layer (step 402). Method 400 may comprise stacking a face veneer, a thermally conductive layer, and a backing layer (step 404). Method 400 may comprise disposing an adhesive material comprising a flame retardant compound between the face veneer and the backing layer (step 406). Method 400 may comprise applying heat and pressure to the face veneer, the thermally conductive layer, and the backing layer (step 408).

In various embodiments, with combined reference to FIG. 4D and FIG. 5, step 402 may comprise forming a plurality of openings 216 comprising a width W1 of 0.04 inches or less through a thermally conductive layer 210. Step 404 may include stacking face veneer 206, thermally conductive layer 210, and backing layer 218. Step 406 may comprise disposing adhesive material 232 between face veneer 206 and backing layer 218. Step 408 may include applying heat and pressure P to face veneer 206, thermally conductive layer 210, and backing layer 218.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A veneer panel, comprising:
   a face veneer;
   a chemically treated thermally conductive layer bonded to the face veneer, the chemically treated thermally conductive layer comprising a metal, wherein a plurality of first vinyl groups is chemically bonded to a first surface of the metal, wherein the plurality of first vinyl groups forms a plurality of first crosslink bonds with a back surface of the face veneer, the plurality of first crosslink bonds extending from the chemically treated thermally conductive layer to the back surface of the face veneer; and
   a backing layer bonded to the chemically treated thermally conductive layer.

2. The veneer panel of claim 1, wherein a plurality of second vinyl groups is chemically bonded to a second surface of the metal, and wherein the plurality of second vinyl groups forms a plurality of second crosslink bonds with a surface of the backing layer.

3. The veneer panel of claim 1, further comprising an adhesive material disposed between the backing layer and a second surface of the metal opposite the first surface of the metal, wherein a plurality of second vinyl groups bonded to the second surface of the metal forms a plurality of second crosslink bonds with the adhesive material.

4. The veneer panel of claim 1, wherein the metal comprises at least one of aluminum, tin, copper, stainless steel, or titanium.

5. The veneer panel of claim 1, wherein a thickness of the chemically treated thermally conductive layer is between 0.001 inches and 0.015 inches.

6. A veneer panel, comprising:
 a face veneer;
 a thermally conductive layer bonded to the face veneer, the thermally conductive layer comprising a metal and having a thickness of greater than 0.0005 inches and less than 0.002 inches; and
 a backing layer bonded to the thermally conductive layer, wherein the veneer panel is incombustible, wherein the thermally conductive layer includes a plurality of vinyl groups chemically bonded to a surface of the thermally conductive layer, and wherein the plurality of vinyl groups forms a plurality of crosslink bonds with at least one of a back surface of the face veneer or a surface of the backing layer.

7. The veneer panel of claim 6, wherein the thermally conductive layer comprises at least one of aluminum, tin, copper, steel, or titanium.

8. The veneer panel of claim 6, further comprising an adhesive material disposed between the face veneer and the thermally conductive layer.

9. The veneer panel of claim 8, wherein the adhesive material comprises a flame retardant compound.

* * * * *